(12) United States Patent
Farley

(10) Patent No.: US 10,518,201 B2
(45) Date of Patent: Dec. 31, 2019

(54) MULTI-MODE FILTERED SHOWERHEAD HAVING MULTIPLE NOZZLE ASSEMBLIES

(71) Applicant: David K. Farley, Corona, CA (US)

(72) Inventor: David K. Farley, Corona, CA (US)

(*) Notice: Subject to any disclaimer, the term of this patent is extended or adjusted under 35 U.S.C. 154(b) by 127 days.

(21) Appl. No.: 15/848,565

(22) Filed: Dec. 20, 2017

(65) Prior Publication Data

US 2019/0184316 A1    Jun. 20, 2019

(51) Int. Cl.

| | |
|---|---|
| *B01D 35/02* | (2006.01) |
| *B01D 27/08* | (2006.01) |
| *B05B 1/18* | (2006.01) |
| *B05B 9/01* | (2006.01) |
| *A01M 7/00* | (2006.01) |
| *B05B 15/65* | (2018.01) |
| *B05B 1/16* | (2006.01) |
| *B05B 1/14* | (2006.01) |

(52) U.S. Cl.
CPC ............. *B01D 35/02* (2013.01); *A01M 7/005* (2013.01); *B01D 27/08* (2013.01); *B05B 1/14* (2013.01); *B05B 1/1627* (2013.01); *B05B 1/1636* (2013.01); *B05B 1/18* (2013.01); *B05B 9/01* (2013.01); *B05B 15/65* (2018.02)

(58) Field of Classification Search
CPC ....... B05B 1/18; B05B 1/1627; B05B 1/1636; B05B 9/01; B05B 1/14; B05B 15/65; B01D 35/02; B01D 27/08; A01M 7/005
USPC ....... 239/443, 444, 446, 447, 525, 530, 536, 239/553–553.5, 575, 587.1, 587.3, 587.4, 239/590–590.5, DIG. 23; 210/282, 449; 4/601

See application file for complete search history.

(56) References Cited

U.S. PATENT DOCUMENTS

| | | | |
|---|---|---|---|
| 6,395,172 B1 * | 5/2002 | Koike | C02F 1/505 |
| | | | 210/282 |
| 6,742,725 B1 * | 6/2004 | Fan | B05B 1/083 |
| | | | 239/447 |
| 8,268,168 B2 * | 9/2012 | Mang | C02F 1/003 |
| | | | 210/449 |
| 9,504,940 B2 | 11/2016 | Farley | |
| 10,016,769 B2 * | 7/2018 | Yin | B05B 1/1654 |

* cited by examiner

*Primary Examiner* — Steven J Ganey
(74) *Attorney, Agent, or Firm* — Klein, O'Neill & Singh, LLP

(57) ABSTRACT

A multi-mode showerhead having a housing with a front and a back and an offset integrated water filter system incorporated into the showerhead. The multi-mode showerhead has a pair of water outlets in the front and a water filter cartridge is easily added to or removed from a hollow filter chamber formed in the showerhead by the removal of a first, front facing adjustable spray nozzle assembly removably held in a first water outlet connected to the hollow filter chamber. A switch to selectively change the spray pattern of a second nozzle assembly is mounted on the front between the pair of water outlets. The entire showerhead with the first and second spray nozzle assemblies and the integrated offset water filter system is mounted on a shower arm by means of a swivel joint forming an inlet on the back of the housing and connected to the hollow filter chamber.

8 Claims, 3 Drawing Sheets

MULTI-MODE FILTERED SHOWERHEAD HAVING MULTIPLE NOZZLE ASSEMBLIES

BACKGROUND OF THE INVENTION

1. Field of the Invention

This invention generally relates to multi-mode filtered showerheads and, more particularly, to a multi-mode filtered showerhead having multiple nozzle assemblies.

2. Description of the Prior Art

Shower filters for use in conjunction with showerheads and multi-mode filtered showerheads for use in showers are known. One such multi-mode filtered showerhead assembly is set forth in U.S. Pat. No. 9,504,940 to Farley. This prior art device discloses a multi-mode showerhead that has a housing with a front and a back and an offset integrated water filter system incorporated into the housing. This prior art showerhead may be easily mounted to a normal shower arm without the need of special tools and a water filter cartridge is easily added to or removed from a hollow filter chamber formed in the showerhead housing by the removal of a front facing filter chamber cap. Furthermore, a single nozzle assembly is integrally formed in the front of the housing at the end away from the hollow filter chamber and a switch to selectively change the spray pattern from the nozzle assembly is mounted on the front, between the water filter system and the nozzle assembly. The entire showerhead and integrated offset water filter system is mounted on a shower arm by means of a swivel joint forming an inlet on the back of the housing and fluidly connected to the hollow filter chamber to provide improved filtration of water passing through the showerhead.

The device of the present invention provides a similar type multi-mode showerhead, but further includes at least a second, removable shower nozzle assembly. This removable nozzle assembly preferably replaces the front facing filter chamber cap so as to provide a multi-mode filtered showerhead with multiple nozzle assemblies that may be selectively controlled to provide filtered water through either or both of the nozzle assemblies, as desired by a user. A water filter cartridge is still easily inserted into and removed from the hollow filter chamber in the showerhead of the present invention by removing the second, removable shower nozzle assembly from a front opening in the water filter housing.

Therefore, there exists a need in the art for an easy-to-install and move, unique modern showerhead and water filter system having multiple shower nozzle assemblies that may be selectively controlled to provide a diverse flow of filtered water, and which also includes a removable nozzle assembly to allow a water filter cartridge to be easily added to or removed from a water filter housing without disassembling or removing the showerhead.

SUMMARY OF THE INVENTION

The filtered showerhead of the present invention provides many advantages including, but not limited to the following:

1) Minimizes showerhead extension by use of an offset shower water filter system placed at one end of a showerhead having multiple nozzle assemblies that allow a more diverse spray function, providing a unique shower experience to a person in the shower area.

2) Front loading of a replacement filter cartridge in the showerhead by removal of a spray nozzle assembly eliminates the requirement for removal of the showerhead from the shower arm and/or disassembly of the showerhead to remove the shower filter cartridge. This novel front loading of a replacement cartridge makes changing of a filter cartridge easier, resulting in the exchanging of a cartridge more often, to thereby maintain maximum filtration.

3) The size and shape of the offset integrated filter system at one end of the showerhead with an adjustable and removable nozzle assembly acts as a counter-balance to the showerhead when raised and keeps the entire showerhead in position.

4) The filtered showerhead of the present invention provides multiple nozzle assemblies with easy adjustment of the spray patterns from the nozzle assemblies, thereby allowing a unique and optimum water flow pattern directed to the user, so as to provide a more enjoyable shower experience.

5) Positioning of a second adjustable and removable nozzle assembly in the front or water side of the showerhead to replace a front facing filter chamber cap allows for a more even distribution of spray nozzles in the showerhead thereby allowing for a more diverse water flow and more enjoyment during a shower.

Accordingly, it is a general object of the present invention to provide an improved combination showerhead and filter assembly. It is a more particular object of the present invention to provide a combination showerhead and offset water filter system. It is a further object of the present invention to provide a combination showerhead and filter assembly with multiple nozzle assemblies in a compact showerhead that does not extend too far into the shower area. It is yet another object of the present invention to provide an offset filtered showerhead with multiple nozzle assemblies that may be easily used to replace an existing showerhead or showerhead water filter combination. It is a still further object of the present invention to provide a novel offset filtered showerhead that has an integrated design that is more aesthetically pleasing, provides a more diverse and enjoyable shower experience and allows easy access to a filter cartridge by removal of an adjustable, removable nozzle assembly.

In accordance with one aspect of the present invention there is provided, a combination multi-mode showerhead having multiple nozzle assemblies and an offset integrated water filter system incorporated into the showerhead and which may be easily mounted to a shower arm without the need of special tools.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figures 1, 2:
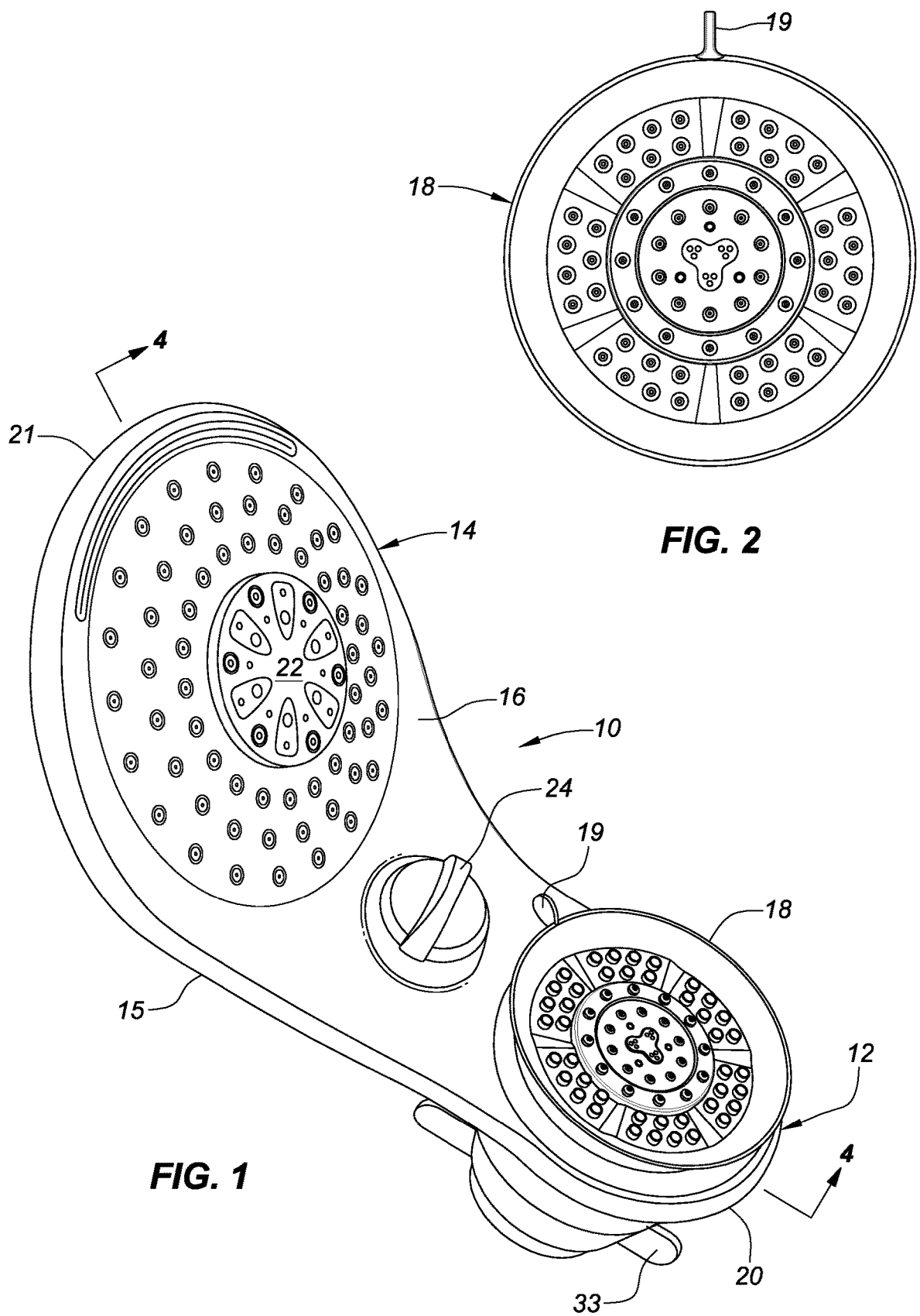
FIG. 1 is a front perspective view of a combination multi-mode showerhead having multiple nozzle assemblies and an offset integrated water filter system of the present invention.
FIG. 2 is a front view of one type of an adjustable nozzle assembly that is removably mounted in a first water outlet formed in front opening in a water filter housing at a first end of the showerhead.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a combination multi-mode showerhead having an offset integrated water filter assembly and multiple shower nozzle assemblies.

The combination multimode showerhead having multiple nozzle assemblies (or spray-heads) and an offset integrated water filter system of the present invention is mounted directly on a regular shower arm coming out of a shower wall (not shown), and is normally screwed on to or otherwise sealingly secured to the shower arm and extends into the shower area.

Turning now to the drawings, the figures illustrate a multi-mode showerhead 10 having an offset integrated water filter system 12 incorporated in the showerhead. The showerhead 10 and water filter system 12 have a multi-piece body or housing 14 with a front face or portion 16 and a rear face or portion 15. The body 14 has a single water inlet and at least two water outlets. A first nozzle assembly 18, having an adjustment lever 19, is removably mounted in a first water outlet connected to the offset water filter system 12 at a first or inlet end 20 of the showerhead. A second nozzle assembly is formed integrally with or held in an area 22 in a second water outlet at a second end 21 of the showerhead. A mode selector switch or knob 24 is held in a central portion of the front face, between the first and second nozzle assemblies. Other nozzle assemblies could be mounted to the showerhead, by modifying the housing 14 to provide additional water outlets, mounting or forming nozzle assemblies therein and providing means to direct water entering the water inlet to such nozzle assemblies.

Figure 3:
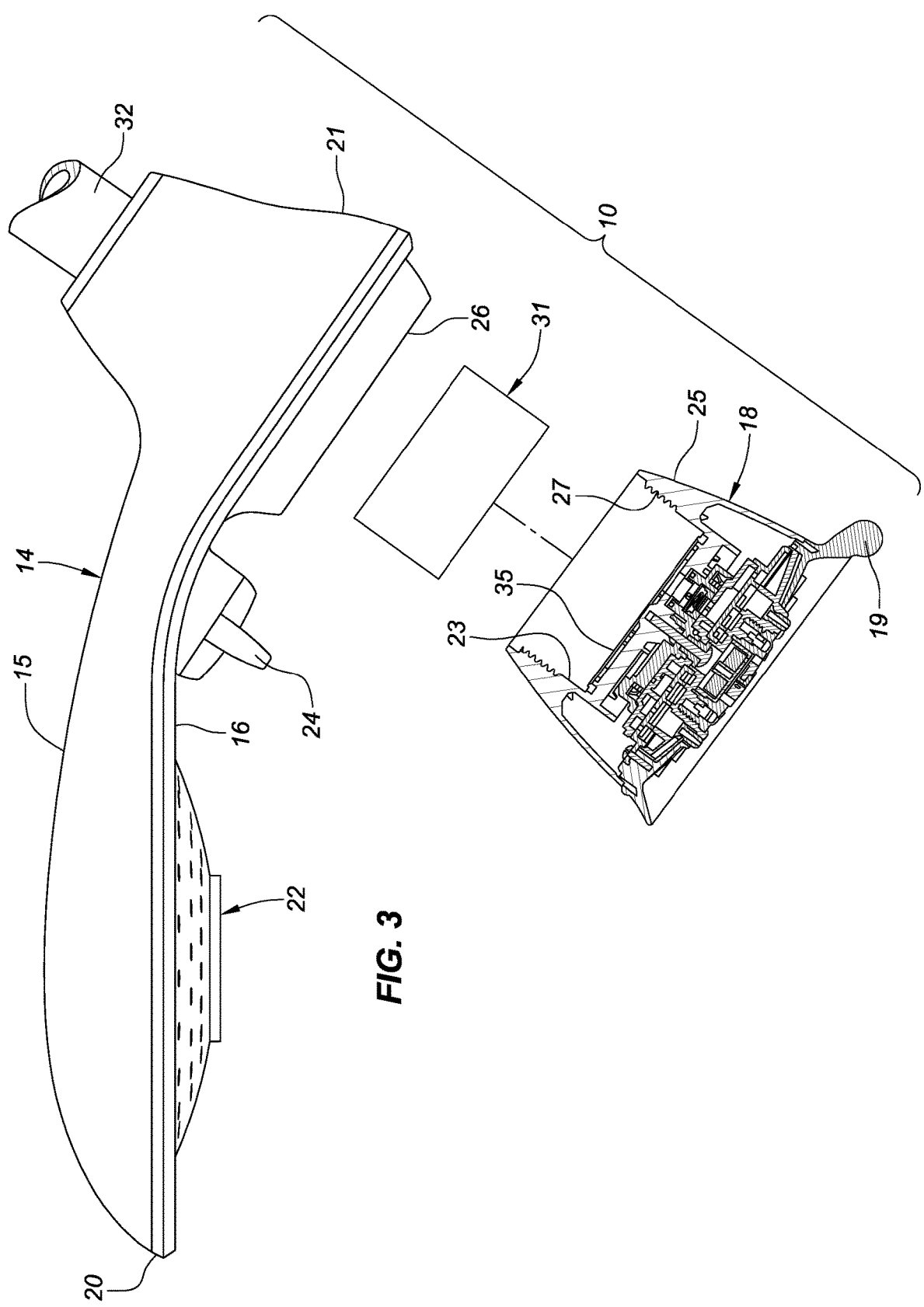
FIG. 3 is a partially exploded side elevational view of a showerhead of the present invention mounted to a shower arm.
Figure 4:
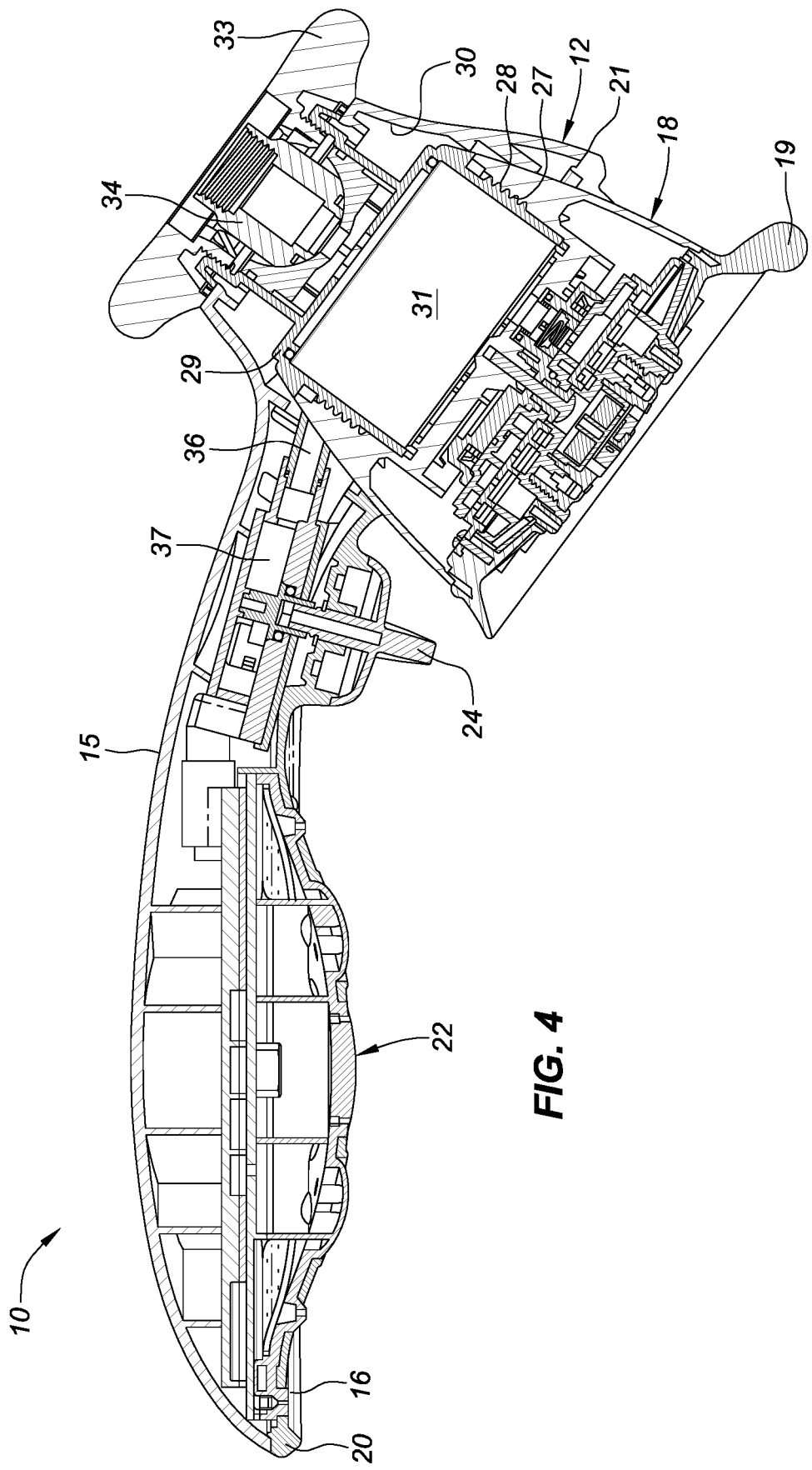
FIG. 4 is a cross-sectional view taken along line 4-4, of FIG. 1.

As best shown in FIGS. 3 and 4, the first, adjustable and removable nozzle assembly 18 may be easily removed from a first water outlet in a front opening 26, formed on or extending from the front face 16 over the water filter assembly as by unscrewing an annular shaped, cap-like portion 25 of the nozzle assembly 18. The cap-like portion 25 is shown having an internal hollow portion 23 having internal threads 27 formed therein. As shown in FIG. 4, this cap-like portion 25 is screwed onto external threads 28 formed on an external surface of an internal holding/sealing element or member 29 held in an hollow inner chamber 30. A filter cartridge 31 is held in the holding element 29.

Or, the filter cartridge 31 may be held in the internal hollow portion 23 and the threaded portions may be reversed. For example, the cap-like portion 25 may be provided with external or male threads on the hollow portion 23 and this cap-like portion would be screwed onto internal or female threads formed on an internal surface of the internal holding/sealing element or member 29. Sufficient clearance to secure the filter cartridge 31 in position therein would be provided. The filter cartridge 31 is easily inserted into or removed from within the holding member 29 in the hollow internal chamber 30, or in the internal hollow portion 23 depending on which version of the removable nozzle assembly 18 is used.

The multi-piece body or housing 14 is easily screwed onto a normal or regular shower arm 32 coming out of a shower wall, not shown, by means of a connector or connecting element 33 (shown in FIGS. 1 and 3) on an enlarged upper area of the rear face or portion 15 of the housing 14, at the inlet end 20. An internally threaded swivel ball or joint 34 extends into and is sealingly held in the housing 14 by means of an extension formed on the internal holding element 29 (see FIG. 4), thereby forming a water inlet into the showerhead.

As shown, the body 14 includes at least upper and lower or front and rear portions or sections 16, 28 secured together in any known manner. The filter cartridge 31 is inserted into and sealing held in the internal chamber 30 against an inner surface of the holding element 29, either before or after the showerhead 10 is mounted on the shower arm 32, through the opening 26 in which the removable nozzle assembly 18 is inserted and held.

The adjustment lever 19 of the removable nozzle assembly is rotated to move selected portions or rings thereof having nozzle openings therein, to open or close selected nozzles therein, in a known manner. This movement of the adjustment lever 19 controls the flow of water through the first nozzle assembly 18, in a known manner, thereby allowing different spray patterns, or, if desired, stopping flow of water there-through completely.

In use, when the showerhead 10 is properly mounted on a shower arm 32, in any known manner as, for example, by means of the screw threads formed internally of the swivel ball 34 and the connector 32, water enters through the inlet and flows through the holding element 29 and then through filter cartridge 31. The hollow internal chamber 30 and the holding element 29 are sized and dimensioned to snugly hold the filter cartridge 31 therein and abutting an interior surface 35 of the removable shower nozzle assembly 18, when it is secured in place. Water passes through the filter media in the filter cartridge 31 and exits through adjustable nozzle assembly 18, if the adjustment lever 19 is in an open position. It is to be understood that the mode selector switch 24 and the adjustment lever 19 assembly may be adjusted to positions where some or all of the filtered water passes through the filter cartridge 31 into the internal chamber 30 and then through one or more connecting passages 36 into selected hollow interior passages 37 of the mode selector switch 24. The mode selector switch 24 is rotated or turned, in a known manner, to direct the filtered water to selected spray nozzles in the second nozzle assembly 22 for exit into the shower area in the selected spray pattern.

The combination multimode showerhead and offset integrated water filter assembly with multiple nozzle assemblies of the present invention may take any number of different configurations, including the addition of one or more nozzle assemblies, depending on the aesthetic look and showering experience desired.

It, therefore, can be seen that the present invention provides an improved, less cumbersome, easy-to-install and use multimode showerhead having multiple nozzle assemblies and an offset integrated water filter assembly providing an integrated design, with a single housing comprised of a number of integrated components that may be easily manipulated, and which may be used with any available shower arm, without the need of special tools or adapters.

Those skilled in the art will appreciate that various adaptations and modifications of the just-described preferred embodiment may be configured without departing from the scope and spirit of the invention. Therefore, it is to be understood that, within the scope of the appended claims, the invention may be practiced other than is specifically described herein.

What is claimed is:

1. A multi-mode showerhead and integrated offset water filter system, comprising;
   a housing having a front portion and a rear portion with a water inlet in the rear portion and at least a first water outlet and a second water outlet in the front portion;
   an integrated hollow water filter cartridge chamber in the housing at one end of the housing and fluidly connected with the water inlet;
   a removable water filter cartridge held in the hollow water filter cartridge chamber;
   a first, adjustable nozzle assembly removably mounted in the first water outlet at said one end of the front portion of the housing and fluidly connected to the hollow water filter cartridge chamber;
   the first adjustable, nozzle assembly having an annular shaped, cap-like portion with threads formed thereon and the water filter cartridge chamber includes complimentary threads formed thereon to enable the first, adjustable nozzle assembly to be removably mounted in the first water outlet; and
   a multi-mode selector element held on the front portion and fluidly connected between the hollow water filter cartridge chamber and a second nozzle assembly in the second water outlet in the front portion at a second end, for selectively directing water exiting the multi-mode selector element out of the second nozzle assembly.

2. The multi-mode showerhead and integrated offset water filter system of claim 1 wherein the hollow water filter cartridge chamber is sized and dimensioned to snugly hold the removable water filter cartridge in place between the water inlet and the first, adjustable nozzle assembly when the first, adjustable nozzle assembly is mounted in the first water outlet and abutting the removable water filter cartridge.

3. The multi-mode showerhead and integrated offset water filter system of claim 2 wherein the water inlet includes a swivel joint with a swivel ball which allows the integrated showerhead to be raised and kept in position on a shower arm and the removable water filter cartridge is held between the swivel joint and an inner surface of the first, adjustable nozzle assembly.

4. The multi-mode showerhead and integrated offset water filter system of claim 3 wherein the first, adjustable nozzle assembly includes an adjustment lever mounted thereon.

5. The multi-mode showerhead and integrated offset water filter system of claim 4 wherein the adjustment lever is connected to rings having nozzle openings therein to control the flow of filtered water through the first water outlet.

6. A multi-mode showerhead and integrated offset water filter system, comprising;
   a housing having a front portion and a rear portion with a water inlet in the rear portion and at least a first water outlet and a second water outlet in the front portion;
   an integrated hollow water filter cartridge chamber in the housing at one end of the housing and fluidly connected with the water inlet;
   the water inlet includes a swivel joint with a swivel ball which allows the integrated showerhead to be raised and kept in position on a shower arm;
   a first, adjustable nozzle assembly removably mounted in the first water outlet at said one end of the front portion of the housing and fluidly connected to the hollow water filter cartridge chamber;
   the first, adjustable, nozzle assembly having an annular shaped, cap-like portion with threads formed thereon and the water filter cartridge chamber includes complimentary threads formed thereon to enable the first, adjustable nozzle assembly to be removably mounted in the first water outlet housing;
   a removable water filter cartridge held in the hollow water filter cartridge chamber between the swivel joint and an inner surface of the cap-like portion of the first, adjustable nozzle assembly; and
   a multi-mode selector element held on the front portion and fluidly connected between the hollow water filter cartridge chamber and a second nozzle assembly in the second water outlet in the front portion at a second end, for selectively directing water exiting the multi-mode selector element out of the second nozzle assembly.

7. The multi-mode showerhead and integrated offset water filter system of claim 6 wherein the hollow water filter cartridge chamber is sized and dimensioned to snugly hold the removable water filter cartridge in place between the swivel joint in water inlet and the inner surface of the cap-like portion of the first, adjustable nozzle assembly when the first, adjustable spray nozzle assembly is mounted in the first water outlet.

8. The multi-mode showerhead and integrated offset water filter system of claim 7 wherein the first, adjustable nozzle assembly includes an adjustment lever connected to rings having nozzle openings held therein to control the flow of filtered water therethrough.

* * * * *